United States Patent Office 3,483,451
Patented Dec. 9, 1969

3,483,451
THIN FILM CAPACITOR
Julius Klerer, Plainfield, N.J., assignor to Bell Telephone Laboratories, Incorporated, Murray Hill and Berkeley Heights, N.J., a corporation of New York
Continuation-in-part of application Ser. No. 558,914, June 20, 1966. This application Feb. 8, 1968, Ser. No. 703,929
Int. Cl. H01g 1/00
U.S. Cl. 317—258                5 Claims

ABSTRACT OF THE DISCLOSURE

Thin film capacitors including a counterelectrode comprising a layer of aluminum and a layer of an alloy containing nickel, iron, and chromium have been found to be substantially moisture insensitve.

---

This application is a continuation-in-part of copending application Ser. No. 558,914, filed June 20, 1966, now abandoned.

This invention relates to tantalum thin film capacitors. More particularly, the present invention relates to tantalum thin film capacitors including two-layer counterelectrodes.

Among the most promising capacitors presently in use in the electronics industry is the tantalum thin film capacitor. This device is conventionally constructed by depositing a thin film of tantalum upon a substrate as, for example, by cathodic sputtering or vacuum evaporation, partially anodizing the freshly deposited film in order to obtain a dielectric oxide layer and finally depositing a counterelectrode in direct contact with the anodized film. Heretofore, the materials most commonly employed as the counterelectrode in devices of this type have been either gold or Nichrome-gold.

Unfortunately it has been observed that tantalum capacitors prepared in this manner evidence a certain degree of instability of capacitance when exposed to changes in relative humidity. These variations in capacitance have been attributed in part to diffusion of water through the counterelectrode material and absorption of the water at the counterelectrode-dielectric oxide interface. Studies of tantalum oxide capacitors including gold or Nichrome-gold counterelectrodes have revealed variations in capacitance of the order of 3 percent and 0.5 percent, respectively, during cycling between 0 percent and 87 percent relative humidity.

Although variations in capacitance of this order of magnitude are tolerable in most applications, the advent of precision networks, such as the notch filter utilized in telephony applications, has created a need for a tantalum thin film capacitor evidencing variations in capacitance of the order of 0.1 percent or lower during humidity cycling.

In accordance with the present invention, a tantalum thin film capacitor meeting these requirements is described. The inventive device is fabricated by depositing a thin film of tantalum upon a substrate by condensation techniques, partially anodizing the tantalum layer to form a tantalum oxide dielectric layer and finally depositing a counterelectrode directly upon the dielectric oxide layer, said counterelectrode comprising a first layer of a chromium-containing material, such as chromium or Nichrome, and a second layer of aluminum. Devices of the described type have been found to evidence variations in capacitance ranging from 0.05 percent to less than 0.02 percent when subjected to humidity cycling from 0–87 percent relative humidity at 25° C. The chromium-containing material may be chromium or a chromium alloy-containing at least 10 percent chromium by weight. Thus, it may be a chromium-nickel alloy containing up to 80 percent nickel by weight or it may be a chromium-nickel-iron alloy containing at least 10 weight percent chromium, up to 80 weight percent nickel, and up to 25, or preferably 20, weight percent iron.

The invention will be more readily understood from the following detailed description taken in conjunction with the accompanying drawing, wherein.

Figure 1:
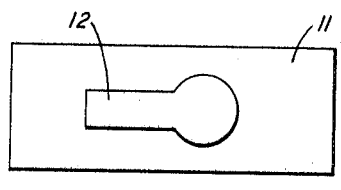
FIG. 1 is a plan view of a substrate with a layer of tantalum deposited thereon.

With further reference now to FIG. 1 there is shown a substrate 11 upon which a metallic pattern is to be produced in accordance with the present invention. The substrates selected should desirably be able to withstand temperatures ranging as high as 400° C. since they may be subjected to such temperatures during the deposition stage of the processing. Preferred substrate materials for this purpose are glasses, glazed ceramics, etc.

Initially, substrate 11 is cleansed by conventional techniques well known to those skilled in the art. Following the cleansing stage a layer of tantalum 12 is deposited upon substrate 11 by conventional procedures as for example, cathodic sputtering, vacuum evaporation, etc., as described by L. Holland in "Vacuum Deposition of Thin Films," J. Wiley and Sons, New York, 1956.

For the purpose of the present invention, the minimum thickness of the layer deposited upon the substrate is dependent upon two factors. The first of these is the thickness of the metal which is converted into the oxide form during the subsequent anodizing step. The second factor is the minimum thickness of unoxidized metal remaining after anodization commensurate with the maximum resistance which can be tolerated in the film-forming metal electrode. It has been determined that the preferred minimum thickness of the metal electrode is approximately 1000 A. There is no maximum limit on this thickness although little advantage is gained by the increase above 10,000 A.

For anodizing voltages up to 250 volts, it has been determined that a metal deposit of at least 4,000 A. is preferred. It is considered that of this 4,000 A. a maximum of approximately 2,000 A. is converted during the anodizing step leaving approximately 2,000 A. as the electrode thickness.

Figure 2:
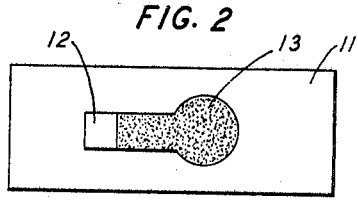
FIG. 2 is a plan view of the body of FIG. 1 after partial anodization thereof.

Following the deposition step, tantalum layer 12 is anodized in an appropriate electrolyte so resulting in an oxide film 13 shown in FIG. 2. The voltage employed during the anodizing step is primarily determined by the voltage at which the resultant device is to be operated. Suitable electrolytes for this purpose are oxalic acid, citric acid, etc.

Figure 3:
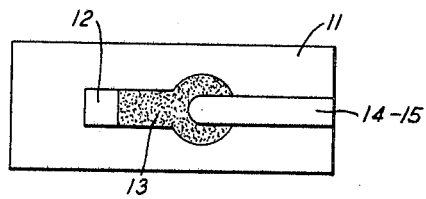
FIG. 3 is a plan view of the body of FIG. 2 after the deposition thereon of a counterelectrode.
Figure 4:
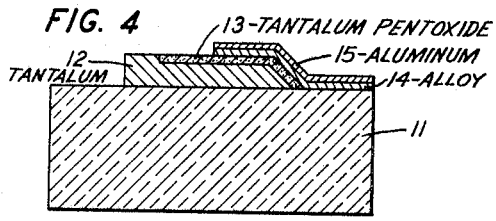
FIG. 4 is a cross-sectional view of the body of FIG. 3.

Following, the inventive counterelectrode 14–15 (FIG. 3) is deposited upon the anodized assembly by conventional vacuum evaporation techniques in a two-step operation. The first stage involves depositing a first layer 14 of a material comprising from 0–80 percent, by weight, nickel, 0–25 percent, by weight, iron, and 10–100 percent, by weight, chromium of a thickness of at least 500 A. on the anodized assembly, the minimum thickness being dictated by practical considerations. Thereafter, a second layer 15 comprising aluminum typically ranging in thickness from 1,000 A.–4,000 A. is deposited upon the first layer. Studies on counterelectrode thickness have revealed that this parameter is not critical, limits being dictated only by practical consideration. A cross-sectional view of the resultant assembly is shown in FIG. 4. An example of the present invention is described in detail below:

EXAMPLE

A 1" by 3" glass microscope slide was employed as the substrate and cleaned with ultrasonic detergent washes and boiling hydrogen peroxide in accordance with conventional techniques. Thereafter, the substrate was positioned in a cathodic sputtering apparatus and a layer of tantalum 4,000 A. in thickness deposited in a 15 spot pattern thereon through a mechanical mask. Following, the tantalum layer was anodized in a 0.01 percent aqueous solution of citric acid until a voltage of 200 volts was attained. At that point, the assembly was left to anodize for 30 minutes at constant voltage. Next, the assembly was back-etched for five seconds at 75 volts in a 0.01 percent solution of aluminum chloride in methanol in order to eliminate defects in the tantalum pentoxide dielectric layer. Then, the assembly was reanodized for 30 minutes at the original anodizing voltage in citric acid.

Finally, the assembly was inserted in an evaporation mask defining the area on which the counterelectrode was to be deposited. A nickel-chromium wire (80 percent nickel-20 percent chromium) 2.5 inches by 0.010 inch in diameter, obtained from commercial sources was next cleaned in acetone and loaded on a prefired helical tungsten filament in an evaporation system. The assembly and mask were then loaded into the system which was evacuated to a pressure of $5 \times 10^{-5}$ millimeters of mercury in about 15 minutes. The wire was evaporated by resistance heating of the filament at 1200–1500° C. for 10 seconds, so resulting in a nickel-chromium layer 500 A. thick. This procedure was then repeated with an aluminum wire 3.1 inches in length having a diameter of 0.030 inch. Heating was conducted at 1000–1500° C. for 10 seconds, so resulting in an aluminum layer 2,000 A. in thickness.

The finished capacitor assembly was then inserted in a Pyrex battery jar having a Plexiglas cover slotted to accommodate up to 8 printed circuit "cinch" trays, which in turn accommodated the life test fixtures which held the samples. All sources of leaks between the "cinch" connectors and the Plexiglas and air were sealed. Final sealing was accomplished by using sealing wax on the entire juncture of jar to cover. Constant humidity conditions were obtained with the following salt solutions:

CONSTANT HUMIDITY SOLUTIONS

| Solution: | R.H., percent |
|---|---|
| Sodium carbonate ($Na_2CO_3 \cdot 10H_2O$) (30° C.) | 87 |
| Sodium nitrite ($NaNO_2$) (20° C.) | 66 |
| Potassium nitrite ($KNO_2$) (20° C.) | 45 |
| Lithium chloride ($LiCl \cdot H_2O$) (20° C.) | 15 |

A hygrometer and thermometer were placed in the battery jar and the entire assembly placed in an air-conditioned humidity controlled room. Capacitance measurements were made with a parallel capacitance bridge by means of a connection cinch tray.

Figure 5:
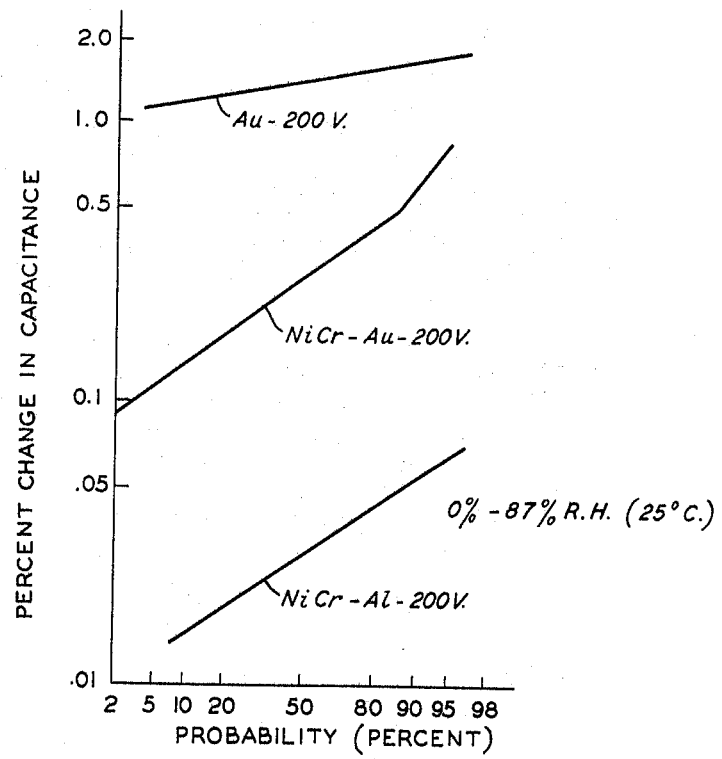
FIG. 5 is a graphical representation (on lognormal paper) on coordinates of percentage change in capacitance against probability in percent showing variations in capacitance as a function of varying humidity at 25° C. for thin film tantalum capacitors formed at 200 volts.

For comparative purposes, the procedure described above was repeated with the exception that gold or gold-Nichrome counterelectrodes were employed. The results for repeated humidity cycling between 0 and 87 percent relative humidity are set forth in FIG. 5. As noted in the figure, the capacitors with gold counterelectrodes exhibited variations in capacitance in the range of 1 to 3 percent and those with Nichrome-gold counterelectrodes exhibited variations ranging from 0.09–0.9 percent. However, capacitors including the inventive counterelectrode evidenced variations in capacitance ranging from 0.06 down to 0.015 percent.

While the invention has been described in detail in the foregoing specification and the drawing similarly illustrates the same, it will be understood by those skilled in the art that variations may be made without departing from the spirit and scope of the invention.

What is claimed is:
1. A solid thin film capacitor including successively a substrate member, a layer of tantalum, an oxide layer of tantalum, and a counterelectrode comprising a first layer consisting essentially of from 0–80 percent, by weight, nickel, from 0–25 percent, by weight, iron, and from 10–100 percent, by weight, chromium, and a second layer consisting essentially of aluminum.

2. A capacitor in accordance with claim 1 wherein said counterelectrode include a layer of aluminum and a layer of a nickel-chromium alloy.

3. A capacitor in accordance with claim 2 wherein said nickel-chromium-alloy layer is at least 500 A. in thickness.

4. A process for the fabrication of a solid thin film capacitor comprising the steps of depositing a layer of tantalum upon a substrate, partially anodizing said tantalum layer whereby there is formed a dielectric tantalum pentoxide layer, depositing a first counterelectrode layer consisting essentially of from 0–80 percent, by weight, nickel, from 0–25 percent, by weight, iron, and from 10–100 percent, by weight, chromium upon said tantalum pentoxide layer, and depositing a second counterelectrode layer consisting essentially of aluminum upon said first layer.

5. A process in accordance with claim 4 wherein said counterelectrode is formed by depositing a layer of nickel-chromium alloy of at least 500 A. in thickness upon said tantalum pentoxide layer and subsequently depositing a layer of aluminum upon said nickel-chromium-alloy layer.

References Cited

UNITED STATES PATENTS

| 2,126,915 | 8/1938 | Norton | 317—256 X |
| 2,993,266 | 7/1961 | Berry | 29—25.42 |
| 3,123,765 | 3/1964 | Julie | 317—258 X |
| 3,179,862 | 4/1965 | Dublier | 317—258 |
| 3,256,588 | 6/1966 | Sikina. | |

ELLIOTT A. GOLDBERG, Primary Examiner

U.S. Cl. X.R.

29—25, 42; 204—3.8; 317—261